3,021,334
PROCESS FOR N-METHYLACRIDONE
William D. Smart, Waukegan, Ill., assignor to Abbott Laboratories, North Chicago, Ill., a corporation of Illinois
No Drawing. Filed June 24, 1959, Ser. No. 822,417
3 Claims. (Cl. 260—279)

This invention relates to a novel process for the synthesis of acrizane and more particularly to a process for preparing N-methylacridone, an intermediate product essential in the preparation of acrizane.

Acrizane is a well-known antiseptic compound. An important intermediate for its preparation is N-methylacridone which can be treated with sodium metal and p-bromo-n-hexyloxyphenylether to form 9-p-hexyloxyphenyl-9-oxysodium-N-methylacridone, which is then hydrolyzed with water to form 9-p-hexyloxyphenyl-9-hydroxyl-N-methylacridone, which in turn is gassed with hydrogen chloride to give acrizane.

There are known in the art many methods for preparing N-methylacridone. Many of these methods are described by R. M. Acheson in the "Chemistry of Heterocyclic Compounds," vol. IX (1956). Other procedures for preparing N-methylacridone are described by Albert and Ritchie "Organic Synthesis," 22, 5 (1945), and by Gleu and Nitzsche "J. Practical Chemistry," 153, 200 (1939).

In employing the procedure described in the preceding paragraphs, as well as other methods, many difficulties have been encountered in preparing N-methylacridone itself, and in finding a synthesis which is adaptable to large scale production. In addition, further problems were encountered in producing N-methylacridone in high yields. For example, it is commonly known in the art to prepare N-methylacridone by cyclizing N-phenylanthranilic acid in the presence of phosphorous oxychloride. However, such cyclization is characterized by a violent reaction which is uncontrollable and therefore unsuitable for large scale production. Also, the complex chemistry in synthesizing N-methylacridone is characterized by the presence of many contaminants which result in a poor yield of the desired product. This is apparently due to such factors as ring closures, shifting of bonds within the rings, the isolation of intermediate products, uncontrollability of temperatures etc.

It is therefore an object of this invention to provide a process of preparing N-methylacridone in high yields.

It is also an object of this invention to provide a process for preparing N-methylacridone which is adaptable to large scale production methods.

Other objects of the invention will be apparent from the detailed description of the process to follow.

The foregoing and other objects and advantages are accomplished according to the following outlined synthesis:

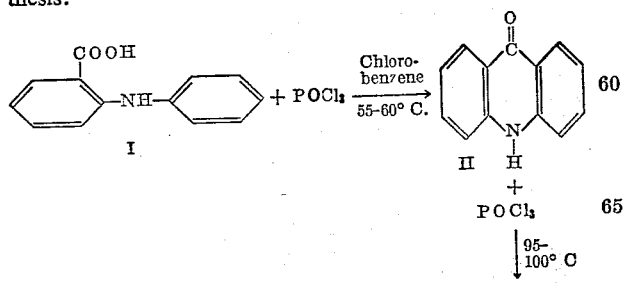

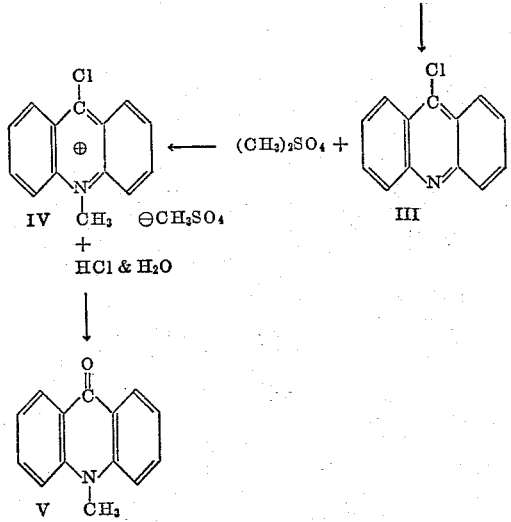

The N-phenylanthranilic acid I is dissolved in chlorobenzene and reacted with about 2 molecular proportions of phosphorous oxychloride at a temperature in the range of about 55–60° C. It is essential that the temperature of the reaction not exceed 60° C. at this point of the synthesis to obtain the improvements of the process. At this temperature, ring closure of N-phenylanthranilic acid is effected to obtain acridone II, the presence whereof is indicated by the reaction solution turning a deep cherry red color. When ring closure is completed, the temperature of the reaction mixture is slowly raised to between 95–100° C. to obtain the chlorinated acridine III, which is shown by the reaction solution taking on a dark green color. By providing two ranges of temperatures for the reaction, the reaction mixture is controllable and lesser amounts of phosphorous oxychloride are necessary. After the acridone is chlorinated, a methyl quaternary agent such as dimethylsulfate, methyliodide or methylbromide is added directly to the reaction mixture to form the corresponding quaternary salt IV. The quaternary salt is removed by water extraction and the extracted solution is subsequently treated, without isolation, with hydrochloric acid to yield 98% pure N-methylacridone V at a yield of greater than 60%.

The advantages offered from the foregoing process are elimination of the characteristic violent reaction, thereby providing use of lesser amounts of reactant, a continuous synthesis without isolation of any intermediates and higher yields of the desired N-methylacridone product. These advantages are realized by process steps which include a two-step temperature treatment which consists in an initial critical temperature range for the reaction of N-phenylanthranilic acid with phosphorous oxychloride and a second temperature range for chlorinating acridone. The use of necessary solvents for the foregoing reaction step (chlorobenzene) and a continuous sequence of process steps which is not interrupted by isolation of any intermediate products also contribute in an essential manner to the success of the method.

The use of chlorobenzene is the preferred solvent in the present embodiment of this invention but it should be understood that other solvents are operable if N-phenylanthranilic acid, phosphorous oxychloride and 9-chloroacridine are all readily soluble therein and which further have a boiling point greater than 120° C.

The following specific example is set forth for the purpose of illustrating the invention and should not be construed to limit the invention to the precise ingredients and proportions shown.

Preparation of N-methylacridone

A mixture comprised of 23 lbs. of N-phenylanthranilic acid and 155 lbs. of mono-chlorobenzene is heated to 55° C. To the heated mixture is slowly added with agitation, over a period of 2 hours, 46 lbs. of phosphorous oxychloride containing 42 grams of sulfuric acid. The temperature is held at 55–60° C. during the addition of the phosphorous oxychloride. After the reaction is completed, the temperature of the reaction mixture is slowly increased over a 3 hour period to 95° C. and the temperature maintained at a range of 95–100° C. for 4 hours. Upon completion of the reaction, the reaction mixture is added to a mixture of 17 gallons of ammonia water and 15 gallons of crushed ice. The temperature of the cooled mixture is kept below 30° C. and agitated for 30 minutes. At the end of the 30 minute period, the mixture is allowed to settle and the botom solvent layer separated and placed in a still. The top water layer is washed with 45 lbs. of mono-chlorobenzene and the bottom solvent layer thereof separated and placed in the still with the previously extracted bottom solvent layer wherein 11 gallons of solvent is removed by distillation. The mixture is cooled to 60° C. and 18.4 lbs. of dimethylsulfate is added thereto over a ½ hour period after which the mixture is heated to 75° C. and this temperature maintained for 3 hours. After the 3 hour period the mixture is cooled with 23 gallons of water having a temperature of about 20° C. The cooled mixture is agitated for 30 minutes after which time the mixture is allowed to settle. The top aqueous layer is separated and retained and the bottom solvent layer is treated with 12 gallons of water having a temperature of about 20° C. The bottom solvent layer which forms from the water treatment is drained off and the two extracted top aqueous layers recovered from the two successive extractions are combined, carbon treated, filtered and 1.5 liters of concentrated HCl is added thereto. The acidified mixture is heated to 80–90° C. and the temperature maintained for 2 hours after which time the mixture is cooled to room temperature and the mixture centrifuged. The resulting product, N-methylacridone, is washed with cold water having a temperature of about 20° C. and air dried at 60° C. If desired, the N-methylacridone can be recrystallized from 3A ethanol. A yield of 13.5 lbs. or 60% is realized having 98% purity.

Others may practice the invention in any of the numerous ways which will be suggested by this disclosure to one skilled in the art. All such practice of the invention is considered to be a part hereof provided it falls in the scope of the appended claims.

I claim:

1. In a method for preparing N-methylacridone from N-phenylanthranilic acid, the improvement comprising reacting a mole of N-phenylanthranilic acid with about 2 moles of phosphorous oxychloride in chlorobenzene, heating the reaction mixture at an initial temperature of 55–60° C. until formation of acridone is substantially complete, thereafter increasing the temperature of the reaction mixture to 95–100° C. until formation of 9-chloroacridine is substantially complete, separating the solvent layer and adding thereto a methyl quaternizing agent, extracting said quaternary salt of 9-chloroacridine with water and treating said water extraction with mineral acid to obtain N-methylacridone.

2. The method of claim 1 in which the methyl quaternizing agent is dimethylsulfate.

3. In a method for preparing N-methylacridone from N-phenylanthranilic acid, the improvement comprising reacting a mole of N-phenylanthranilic acid with about 2 moles of phosphorous oxychloride in chlorobenzene, heating the reaction mixture at an initial temperature of 55–60° C. until formation of acridone is substantially complete, thereafter increasing the temperature of the reaction mixture to 95–100° C. until formation of 9-chloroacridine is substantially complete, separating and condensing the solvent layer, adding dimethylsulfate thereto, extracting said quaternary salt of 9-chloroacridine with water and treating said water extraction with hydrochloric acid to obtain N-methylacridone.

References Cited in the file of this patent

MacArdle: "Use of Solvents," pages 1–3 (1925).
Gleu: Journal Prakt. Chemie, vol. 153, pages 216 and 222 (1939).